No. 693,367. Patented Feb. 18, 1902.
H. BROOKE.
PIPE JOINT.
(Application filed Dec. 6, 1899.)
(No Model.) 2 Sheets—Sheet 1.
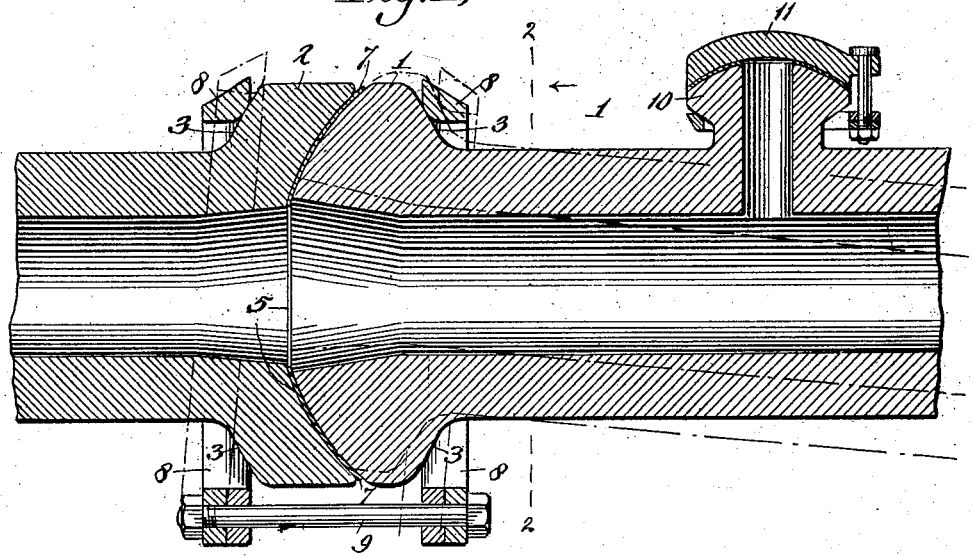
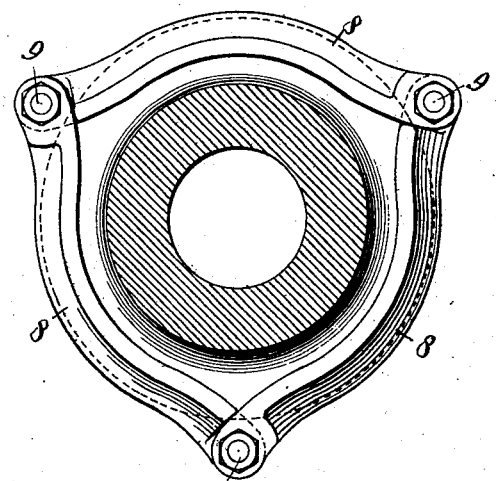 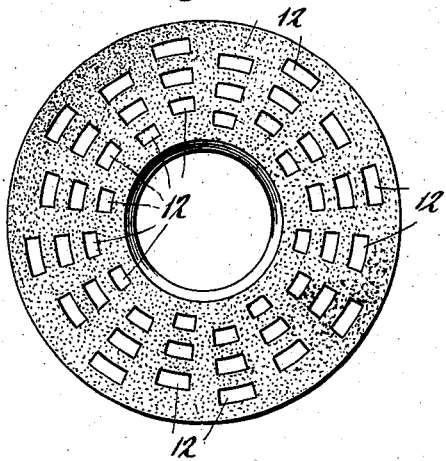
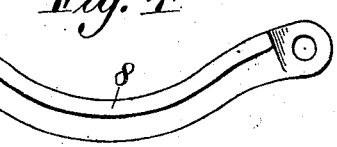
WITNESSES: INVENTOR
Homer Brooke
BY
Ernest Hopkinson
his ATTORNEY

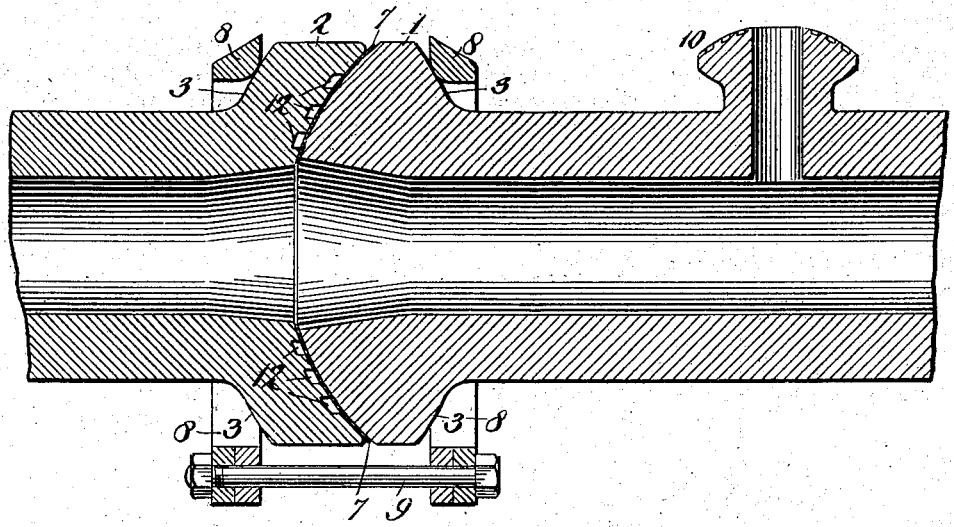

UNITED STATES PATENT OFFICE.

HOMER BROOKE, OF JERSEY CITY, NEW JERSEY.

PIPE-JOINT.

SPECIFICATION forming part of Letters Patent No. 693,367, dated February 18, 1902.

Application filed December 6, 1899. Serial No. 739,353. (No model.)

*To all whom it may concern:*

Be it known that I, HOMER BROOKE, a citizen of the United States, residing at No. 40 Linden avenue, in the city of Jersey City, county of Hudson, and State of New Jersey, have invented a new and useful Improvement in Pipe-Joints, of which the following is a specification.

The present invention relates to pipe-joints. The object of the invention is to provide a joint which may be easily and cheaply made, and is designed to provide a joint in which slight radial movement of one pipe-section relatively to the other is permitted, while the joint is maintained fluid-tight. It is desirable to provide a pipe in which the joints between the sections thereof are of the character herein specified, as when a pipe is laid in position, as in the street, and the surrounding earth is filled in a settling takes place, which if the pipe-joints do not permit a slight radial movement will cause the fracture of the pipe-sections.

Primarily, the object of the invention is to make a joint which it is practically possible to use in connection with pipe-sections made of brittle material; but the invention is not limited to its embodiment in pipe-sections made of such material.

I am aware that it is old to make various forms of ball-and-socket joints between pipe-sections which are designed to be fluid-tight; but these forms of joints are objectionable in that they are difficult and expensive to make and are not well adapted to form a conduit for fluids under pressure, as there is in most of them the objectionable feature of an outer inclosing ball member and an inner female portion, between which and the outer ball member there is a more or less sliding fit, and the fluid-tight closure must be effected by more or less rigid packings, which controvert the object of the invention. I am also aware that it is old to make pipe-sections having threaded ends and then to screw onto such ends a separate flange; but in such construction the fit or fluid-tight closure is not obtained by having the two flanges provided with surfaces which may abut against each other or an intermediate packing throughout their entire surface. In such form of joint, again, the fluid-tight closure is obtained by having an annular ring or gasket between the two surfaces.

In my invention I make a pipe-section which has two integrally-formed flanges, the entire abutting surface of one of which is made concave, while the other flange has its entire abutting surface made convex and corresponding to the concave flange. By this it will be seen that in a joint of two pipe-sections made according to my invention there is a flange integrally formed with its pipe-section and having its entire abutting surface made concave and a corresponding flange made integral with the contiguous pipe-section and having its entire abutting surface made convex, the concave and convex surfaces being in abutment and maintained in fluid-tight connection by independent flanges. In the practice of my invention it is designed that the abutting surfaces shall be ground, turned, or otherwise formed true to each other, so that no packing is absolutely necessary. In practice, however, where I use a pipe made of vitreous material I may insert a sheet of paraffin-paper; but this is more for the purpose of permitting the ready disassociation of two pipe-sections after long use than for any packing function it may exercise.

While I have stated that the entire surfaces of the flanges are concave or convex, as the case may be, the reason for this is that there shall be no projections to interfere with the radial movement of one pipe-section relatively to another, and it will be perfectly obvious that to attain this object it will be necessary that only one of the flanges shall have its entire abutting surface made concave or convex, as the case may be.

In the drawings I have illustrated a construction which embodies the invention, which I have actually used and found to be a desirable form.

In said drawings, Figure 1 is a view in longitudinal vertical section. Fig. 2 is a view taken along line 2 2 of Fig. 1. Fig. 3 is an end elevation view of one of the abutting surfaces of the modified construction shown in Fig. 5. Fig. 4 is a detailed view showing one of the flange members. Fig. 5 is a view of a modified form, the same being a longitudinal vertical section.

Like numerals refer to like parts throughout the several views of the drawings.

Referring to said drawings in detail, 1 designates the male flange, while 2 designates the female, the rear sides 3 of which flanges or the sides opposite to the abutting surfaces are made on a curve or are inclined toward the abutting surfaces, so as to give a maximum strength to the flanges and to permit of the easy and ready movement of the independent securing-flanges.

The entire abutting surfaces of the flanges are ground, turned, or otherwise formed true, the surface 5 of the female portion being made concave, while the abutting surface of the male portion is made convex. Between these two surfaces may be placed a sheet of packing material 7. This packing material is not primarily for the purpose of making the joint fluid-tight, but is designed to serve the office of rendering the two parts more easily separable after they have been united for a long period of time. For this purpose I have found a sheet of paraffin-paper to be perhaps preferable; but I do not wish to limit myself to this particular material.

The pipe-sections are secured together by the independent flanges 8. These flanges, as illustrated in the drawings, are preferably made up of three pieces, which when associated together encircle the pipe, leaving an aperture between the pipe and the inner periphery of the flange to permit of slight radial movement of the pipe-sections relatively to each other, as illustrated in dotted lines in Fig. 1. In associating two pipe-sections together I place the integrally-formed flanges in the desired position relatively to each other and then place the independent flanges around the pipe behind each of the flanges. I then secure the independent flanges and connect them together by means of the bolts 9. (Shown in Figs. 1 and 2.) Of course the connection of the two pipe-sections and the securing of them together by the independent flanges will be in such manner as to approximate the desired relative position of the two sections in permanent position; but it will be seen that whatever the position in which the sections are secured a slight movement under strain in any direction is possible.

In Figs. 1 and 5 I have shown a nipple 10, provided with a cap 11. It will be understood that pipe-sections made of vitreous material are to be provided at suitable distances with a nipple of this kind for purposes of tapping, as the ordinary method used in connection with metal pipes would be impracticable in connection with glass. This nipple consists simply of a short projecting pipe-section having a flange of male or female character closed by a cap 11. When it is desired to make a tap, the cap is removed and the pipe-section secured to the nipple 10. In Fig. 5 I have illustrated a modified form of construction. The modification consists in molding into the abutting surfaces of the flanges of contiguous pipe-sections a number of recesses 12. These recesses may be of any desired form, those shown in the drawings being of rectangular form. The object of providing these abutting surfaces with recesses is as follows: It is very difficult to grind a concave surface in glass, and the recesses take away a great portion of the surface necessary to be ground, while at the same time the fluid-tight character of the joint is unaffected. This minimizes the labor necessary to make a true surface. The same procedure may be followed out in connection with the convex surfaces; but this is not as important, as the grinding of it does not present the same difficulties as is the case with the concave surface. Again, the recesses formed in the abutting surfaces constitute receptacles for holding grinding material.

I have shown the inner diameter of the tube as flaring or slightly increased at the end portions or flanges. The object of this is simply to permit of radial movement, while at the same time maintaining the full diameter of the pipe.

What is claimed as new is—

1. A pipe-joint, the same consisting of two pipe-sections, one of which is provided with an integrally-formed flange having a concave abutting surface, and the other pipe-section is provided with an integrally-formed flange having a convex abutting surface, the rear surface of each of said flanges being inclined toward the abutting surfaces, and means, independent of said flanges, whereby said flanges are maintained in fluid-tight abutment permitting of radial movement of each of the pipe-sections relatively to the other, substantially as specified.

2. A pipe-joint, the same consisting of two pipe-sections, one of which is provided with an integrally-formed flange having a concave abutting surface, and the other pipe-section is provided with an integrally-formed flange having a convex surface, the rear surface of each of said flanges being inclined toward the abutting surfaces, and independent separable flanges encircling the pipe-sections, the interior diameters of said flanges being greater than the inclosed pipe-section, and less than the diameter of the outer periphery of the integrally-formed flanges, said independent flanges being secured together to maintain the pipe-section flanges in fluid-tight abutment permitting of radial movement, substantially as specified.

3. A pipe-joint, the same consisting of two pipe-sections, one of which is provided with an integrally-formed flange having a concave abutting surface, and the other is provided with an integrally-formed flange having a convex abutting surface, one of said abutting surfaces being provided with a plurality of independent recesses arbitrarily shaped and disposed, and means, independent of said flanges, whereby said flanges are maintained in fluid-tight abutment permitting of radial movement of the pipe-sections relatively to each other, substantially as specified.

4. A pipe-joint, the same consisting of two vitreous pipe-sections, one of which is provided with an integral vitreous flange having a concave ground abutting surface and the other with an integral vitreous flange having a convex ground abutting surface, and means independent of said flanges whereby said flanges are maintained in fluid-tight abutment permitting of radial movement of each of the pipe-sections relatively to the other, substantially as described.

5. A pipe-joint, the same consisting of two vitreous pipe-sections, one of which is provided with an integral vitreous flange having a concave ground abutting surface and the other with an integral vitreous flange having a convex ground abutting surface, and means, independent of said flanges, whereby said flanges are maintained in fluid-tight abutment permitting of radial movement of each of the pipe-sections relatively to the other, the line of force exerted by said securing means passing through the abutting surfaces of said vitreous flanges, substantially as specified.

6. A pipe-joint, the same consisting of two vitreous pipe-sections, one of which is provided with an integral vitreous flange having a concave ground abutting surface, and the other with an integral vitreous flange having a convex ground abutting surface, the rear surface of each of said flanges being inclined toward the abutting surfaces, and independent separable flanges encircling the pipe-sections, the interior diameter of said flanges being greater than the inclosed pipe-sections and less than the diameter of the outer periphery of the vitreous flange, said independent flanges being secured together to maintain the vitreous flanges in fluid-tight abutment permitting of radial movement, substantially as specified.

7. A pipe-joint, the same consisting of two vitreous pipe-sections, one of which is provided with an integral vitreous flange having a concave ground abutting surface and the other with an integral vitreous flange having a convex ground abutting surface, the rear surface of each of said flanges being inclined toward the abutting surfaces, and independent separable flanges encircling the pipe-sections, the interior diameter of said flanges being greater than the inclosed pipe-sections and less than the diameter of the outer periphery of the vitreous flanges, said independent flanges being secured together to maintain the vitreous flanges in fluid-tight abutment permitting of radial movement, the line of force exerted by said separable securing-flanges passing through the abutting surfaces of said vitreous flange, substantially as specified.

In testimony whereof I have hereunto set my hand in the presence of two subscribing witnesses.

HOMER BROOKE.

Witnesses:
JOHN E. FRYER,
I. M. SHELLEY.